United States Patent [19]

Moore, III

[11] Patent Number: 4,619,588

[45] Date of Patent: Oct. 28, 1986

[54] WET MOTOR GEROTOR FUEL PUMP WITH VAPOR VENT VALVE AND IMPROVED FLOW THROUGH THE ARMATURE

[75] Inventor: Harry W. Moore, III, Watkins Glen, N.Y.

[73] Assignee: Facet Enterprises, Incorporated, Tulsa, Okla.

[21] Appl. No.: 603,599

[22] Filed: Apr. 25, 1984

[51] Int. Cl.[4] .......................... F04C 15/02; F04C 2/10; H02K 21/06; F16D 1/08

[52] U.S. Cl. .................................... 417/366; 417/410; 418/171; 418/182; 310/154; 403/359

[58] Field of Search ................ 417/366, 410; 310/154, 310/54, 59; 384/202; 137/517, 199; 418/171, 182; 403/359

[56] References Cited

U.S. PATENT DOCUMENTS

| | | | |
|---|---|---|---|
| 2,513,227 | 6/1950 | Wylie | 310/154 |
| 2,525,695 | 10/1950 | Lombard | 403/359 X |
| 2,544,476 | 3/1951 | Venning | 137/199 |
| 2,966,118 | 12/1960 | McAlvay | 417/291 X |
| 3,267,862 | 8/1966 | Mosbacher | 418/171 X |
| 3,418,991 | 12/1968 | Shultz et al. | 417/366 |
| 3,969,044 | 7/1976 | Fussner et al. | 417/410 |
| 4,004,533 | 1/1977 | Woolston | 137/517 X |
| 4,181,473 | 1/1980 | Ina | 417/366 X |
| 4,209,284 | 6/1980 | Lochmann et al. | 415/198.2 X |
| 4,447,192 | 5/1984 | Tuckey | 417/410 X |
| 4,500,270 | 2/1985 | Tuckey | 418/171 X |

FOREIGN PATENT DOCUMENTS

| | | | |
|---|---|---|---|
| 664390 | 6/1963 | Canada | 417/366 |
| 3202179 | 8/1983 | Fed. Rep. of Germany | 418/171 |
| 58-53695 | 3/1983 | Japan | 417/424 |
| 1398079 | 6/1975 | United Kingdom | 417/366 |

*Primary Examiner*—William L. Freeh
*Assistant Examiner*—Theodore W. Olds
*Attorney, Agent, or Firm*—Remy J. VanOphem

[57] ABSTRACT

One set of circumferentially juxtaposed axial surfaces of the motor magnets of a wet motor gerotor pump are separated circumferentially by a tunnel device having a central bridge portion radially just clearing the rotating armature and bounded by a pair of leg portions extending radially outwards from the central bridge portion to establish a substantially laminar flow path for the fuel. The tunnel device further spaces the armature relative to the gerotor pump cavity. A vent valve is provided in the outlet housing of the pump. A spring biases a ball valve against an imperfect seat encircling the inlet passage to provide a permanent vent bypass passage therebetween. The spring seats the ball valve against the imperfect seat to permit fuel vapors to vent through the vent outlet passage until liquid reaches the ball valve. The liquid then overcomes the bias of the spring to seat the ball against an outlet seat encircling the outlet passage to close the same.

19 Claims, 20 Drawing Figures

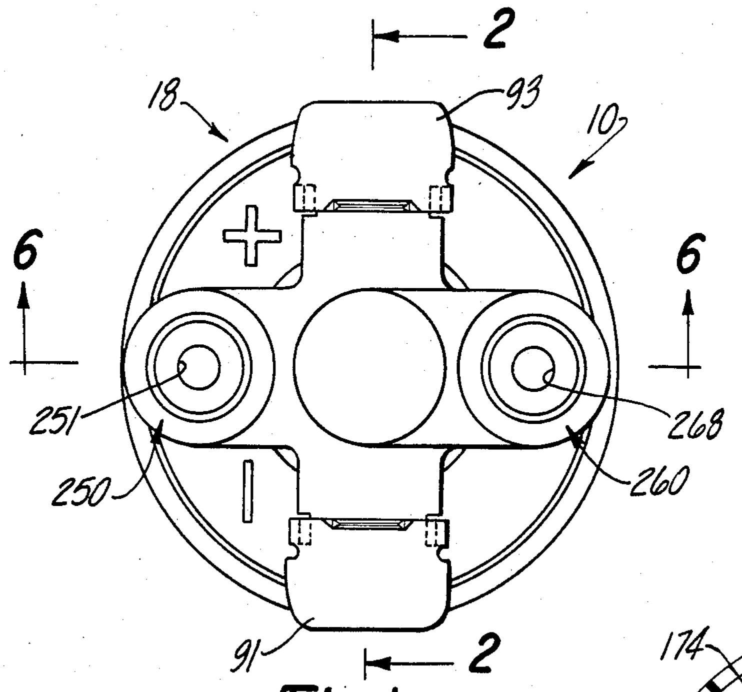
Fig-1
Fig-3
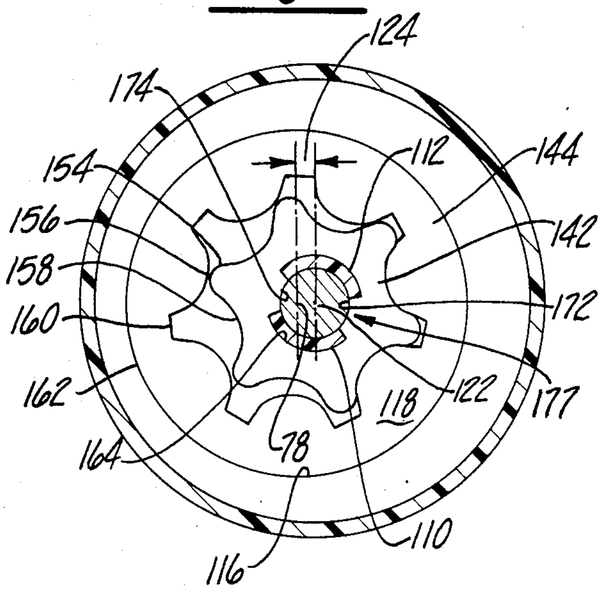
Fig-4
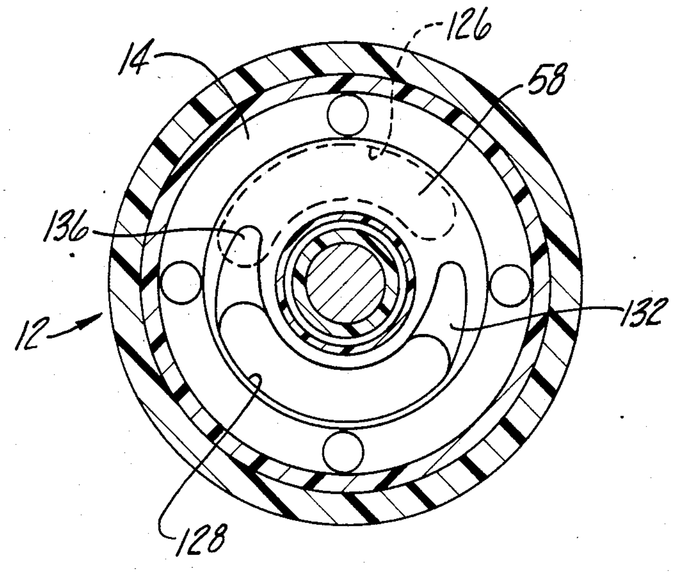
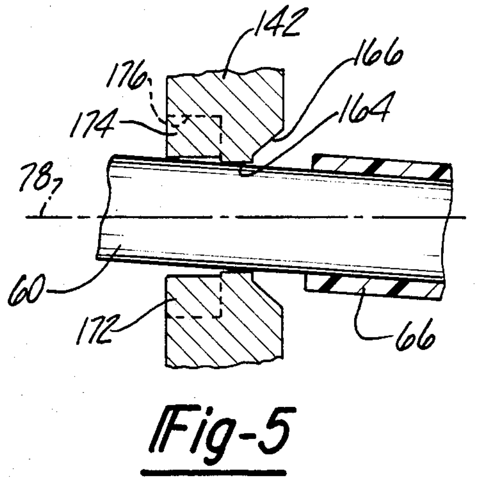
Fig-5

Fig-12
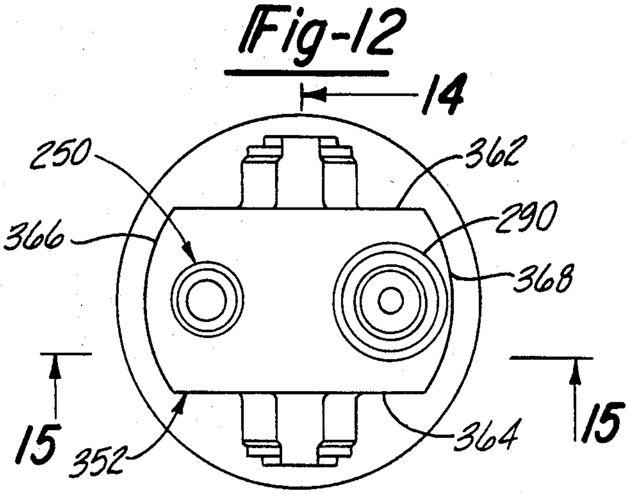
Fig-15
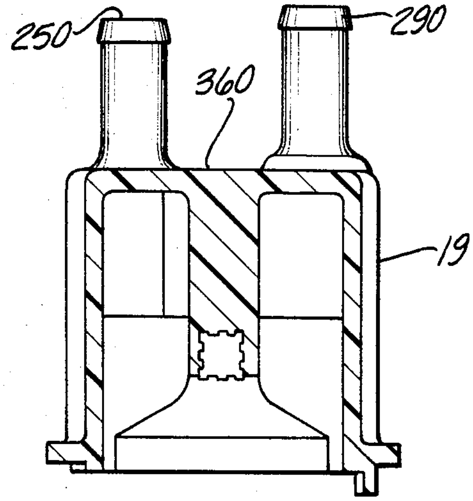
Fig-13
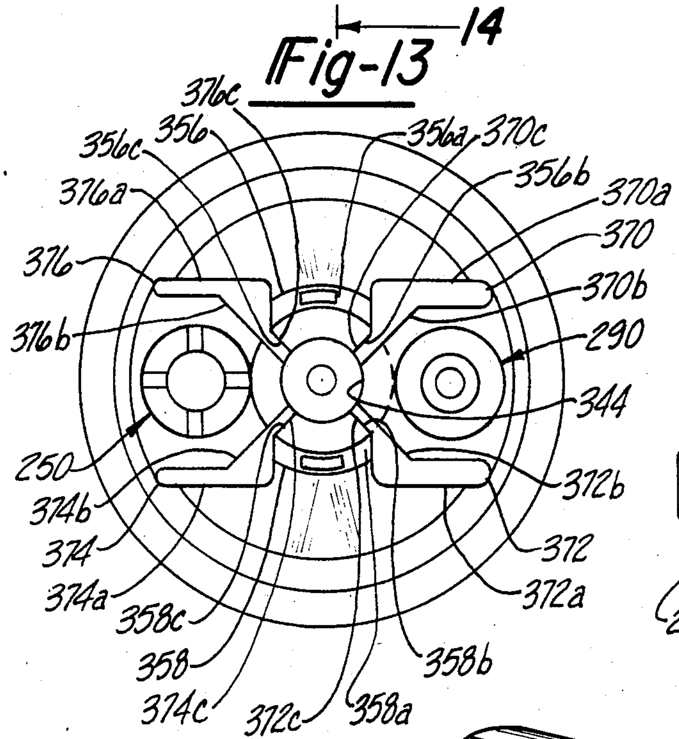
Fig-14
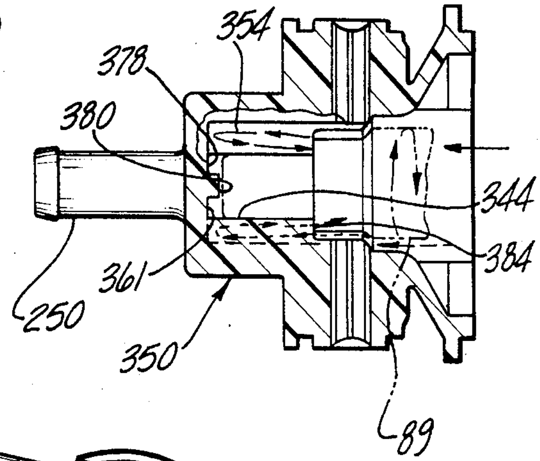
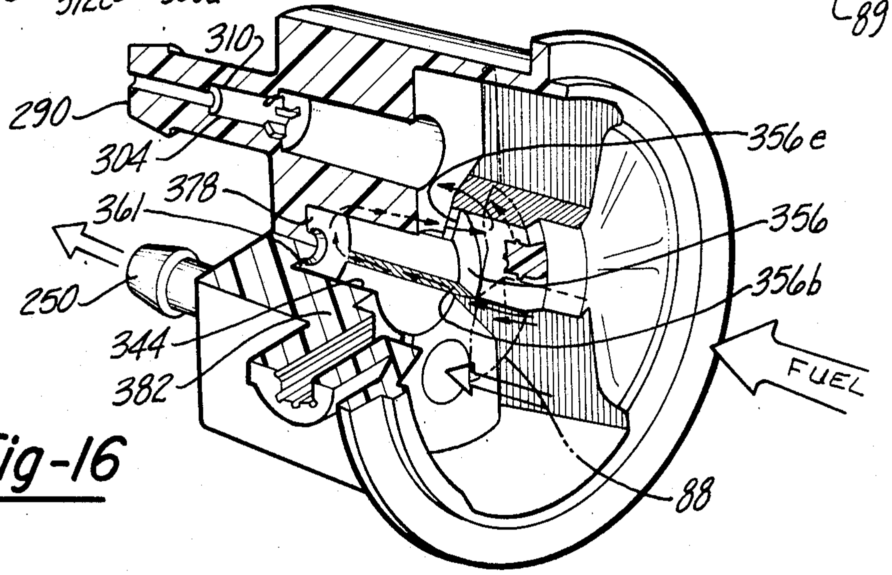
Fig-16

WET MOTOR GEROTOR FUEL PUMP WITH VAPOR VENT VALVE AND IMPROVED FLOW THROUGH THE ARMATURE

CROSS REFERENCE TO RELATED CASES

This application is related to the following commonly-assigned applications filed concurrently herewith and the disclosures of which are hereby expressly incorporated herein by reference.

1. Ser. No. 603,564, filed Apr. 25, 1984, entitled "Wet Motor Gerotor Fuel Pump" by Michael V. Wiernicki;

2. Ser. No. 603,611, now U.S. Pat. No. 4,580,951, filed Apr. 25, 1984, entitled "Wet Motor Gerotor Fuel Pump With Fuel Flow Through The Bearing For Cooling Thereof" by William A. Carleton, James R. Locker, Harry W. Moore III, and David L. Williams;

3. Ser. No. 603,590, filed Apr. 25, 1984, entitled "Wet Motor Gerotor Fuel Pump With Self-aligning Bearing" by William A. Carleton; and 4. Ser. No. 603,585, filed Apr. 25, 1984, entitled "Vent-Relief Valve For A Wet Motor Gerotor Fuel Pump" by William A. Carleton and Harry W. Moore III now abandoned.

BACKGROUND OF THE INVENTION

1. Field of the Invention

The present invention relates to wet motor fuel pumps and, more particularly, to a wet motor fuel pump of the type wherein the fuel flows in a channel past the armature and, while not operating, produces vapor pressures that must be relieved, and/or is for any other reason filled with matter in a vapor state.

2. Description of the Prior Art

In wet motor fuel pumps where fuel flows past a rotating armature in channels, such as between the juxtaposed axial sides of the motor magnets, the armature windage induces radially-oriented hydraulic curls in the radially disposed channels, such curls creating a turbulence. Moreover, the comparatively narrow circumferential width of the channel when compared to its length induces circumferentially oriented curls, introducing more turbulence. Added to these two sources of turbulence is that introduced by the hydraulic equivalent of a multi-blade turbine siren. The extreme turbulence produced by these three phenomena reduces the effective intermagnet channel area to a small portion of the available cross-sectional area, with the result that neither the maximum available increase in flow rate past the armature nor the maxiumum available reduction in required armature current is obtained. A further problem exists in properly positioning the axial flow channel axially and circumferentially with respect to the outlet port of the pump outlet plate and the outlet passage of the outlet housing of the pump.

A further problem with any fuel pump of the gerotor type is that such pump when rotating at its normal rates is not sufficiently efficient to pump gases, such as fuel vapors, as compared to liquids, such as fuel gas. The generation of fuel vapors in any fuel pump is a common occurrence. Gerotors meeting less than the tightest tolerances on the tip clearances and also flatness and parallelism are unable to self prime themselves. But in a gerotor pump of the type having a check valve in the pump outlet to prevent backflow from the engine, such vapor pressures continue to build as the motor continues to spin and generate heat. The little fluid that may be introduced through the pump inlet is vaporized to a level where the vapor pressure forces the fuel back out of the inlet.

SUMMARY OF THE PRESENT INVENTION

The present invention recognizes that at least the radially oriented curl introduced by the armature windage may be eliminated by radially shielding the axial flow channel from the armature and that the circumferentially induced curl may be reduced substantially by subdividing the available cross-sectional area of the axial channel into subchannels assuring smooth laminar flow and increasing efficiency. The present invention further recognizes that the structural element separating the juxtaposed side surfaces of the motor magnets may also be used for the three additional functions of shielding the channel from the armature, spacing the motor magnets axially with respect to the pump outlet plate, as well as circumferentially with respect to both the outlet port of the pump outlet plate and the outlet passage of the outlet housing.

The present invention further recognizes that a gerotor fuel pump of the type having a check valve in the outlet passage to prevent backflow may be vented by an additional valve designed to be open to permit venting of the vapors and subsequently closed when liquid reaches the outlet side of the pump.

In accordance with the present invention, one set of circumferentially juxtaposed axial surfaces of the motor magnets of a wet motor gerotor fuel pump are separated circumferentially by a tunnel device having a central bridge portion radially positioned to clear the rotating armature and bounded by a pair of leg portions extending radially outwards from the central bridge portion and opening circumferentially away therefrom to abut against the axial surfaces of the motor magnets. The tunnel device has a pair of radial tabs extending circumferentially outwards to abut and restrain a radial end face of each of the motor magnets. The tunnel device also has a pair of protrusions extending axially from the radial tabs, each of such protrusions abutting axially against the pump outlet plate to position the motor magnets therefrom and one of the protrusions engaging a locator hole in the pump outlet plate to position the motor magnets circumferentially with respect to an outlet port in the pump outlet plate.

Also, in accordance with the present invention, a vent valve is provided in the outlet housing of the pump, the vent valve having an inlet passage and a vent outlet passage, a valve bore located therebetween, and a ball valve positioned therein. A spring biases the ball valve against an imperfect seat encircling the inlet passage to provide a permanent vent bypass passage therethrough. The spring seats the ball valve against the imperfect seat to permit fuel vapors to vent through the vent bypass passage and through the vent outlet passage until liquid reaches the ball valve. The liquid then overcomes the bias of the spring to seat the ball valve against an outlet seat encircling the outlet passage close the vent outlet passage after the vapors have escaped from the gerotor pump.

It is, therefore, a primary object of the present invention to provide a new and improved wet motor gerotor fuel pump.

It is another primary object of the present invention to provide a fuel pump of the foregoing type wherein the flow rate is substantially smoother and the flow rates are increased at substantially reduced armature currents when compared to conventional fuel pumps of comparable size and capacity.

It is another object of the present invention to provide a fuel pump of the foregoing type wherein the fuel flowing past the rotating armature is substantially free of radially oriented curls induced thereby.

It is a further primary object of the present invention to provide a fuel pump of the foregoing type wherein the fuel is channelled past the rotating armature in at least one channel established between the juxtaposed axial surfaces of a pair of motor magnets, the fuel channel being shielded radially from the rotating armature.

It is another object of the present invention to provide a fuel pump of the foregoing type wherein the fuel flow is so shielded by the central bridge portion of a tunnel device having a pair of radial tabs extending circumferentially away from a central bridge portion to abut against the radial end surfaces of the circumferentially juxtaposed motor magnets.

It is a further object of the present invention to provide a tunnel device of the foregoing type having a location portion extending axially to abut against a pump outlet plate of the pump and thereby position the motor magnets axially with respect to the pump outlet plate, the location portion also positioning the tunnel device circumferentially with respect to an outlet port of the pump outlet device.

It is a further primary object of the present invention to provide a gerotor pump having a one-way check valve in its outlet passage to prevent backflow into the pump and a vent valve to vent fuel vapor until liquid reaches the vent valve.

It is a further object of the present invention to provide a gerotor pump of the foregoing type wherein the vent valve includes a valve member cooperating with an imperfect seal to provide a permanently open vent bypass passage therethrough, the vent valve having a vent outlet passage closed by the valve member when liquid reaches it.

These and other features and objects of the present invention will become more apparent to those skilled in the art from the following description of a preferred embodiment thereof and the appended claims, all taken in conjunction with the appended drawings wherein:

BRIEF DESCRIPTION OF THE DRAWINGS

FIG. 1 is an end view of one embodiment of a wet motor gerotor fuel pump having certain features provided in accordance with the present invention;

FIG. 3 is a transverse radial cross-sectional view of the gerotor fuel pump of FIG. 2 taken along line 3—3 thereof;

FIG. 4 is a transverse radial cross-sectional view of the gerotor fuel pump of FIG. 2 taken along line 4—4 thereof;

FIG. 5 is an enlarged and exaggerated view of portions of an armature shaft and inner gerotor pump gear;

FIG. 12 is a top view of the alternate outlet housing of FIG. 10;

FIG. 13 is a bottom view of the internal configuration of the alternate outlet housing of FIG. 12;

FIG. 14 is a cross-sectional view through just the alternate outlet housing of FIGS. 10, 12, and 13 taken along line 14—14 of FIG. 12;

FIG. 15 is a view taken through just the outlet housing of FIGS. 10, 12, 13, and 14 taken along line 15—15 of FIG. 12; and FIG. 16 is an exploded view in perspective of certain features of the alternate outlet housing assembly, certain parts thereof being broken away.

DETAILED DESCRIPTION OF THE PREFERRED EMBODIMENT

Figure 2:
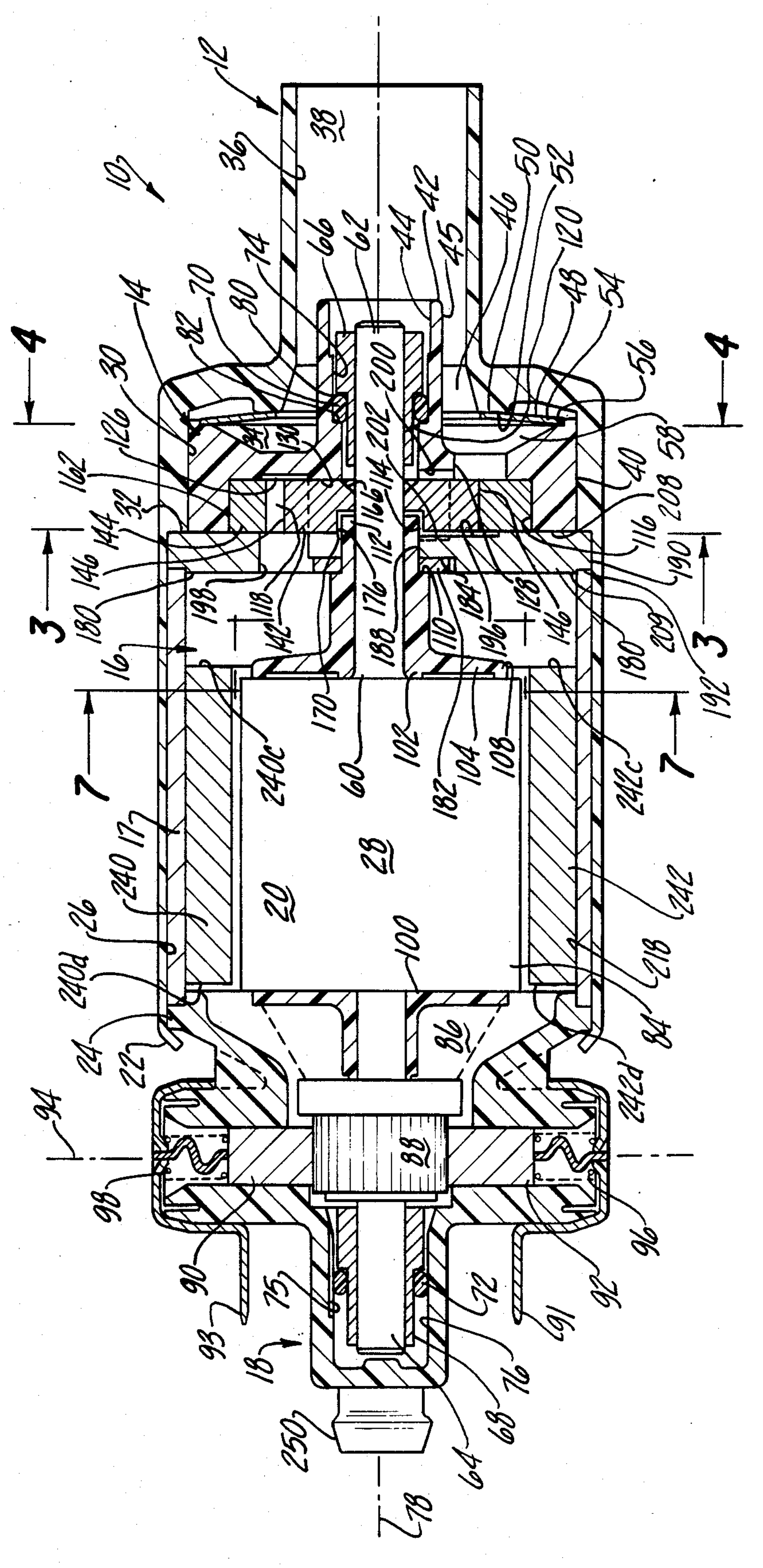
FIG. 2 is an axial cross-sectional view of the gerotor fuel pump of FIG. 1 taken along line 2—2 thereof.
Figures 9, 9A, 9B:
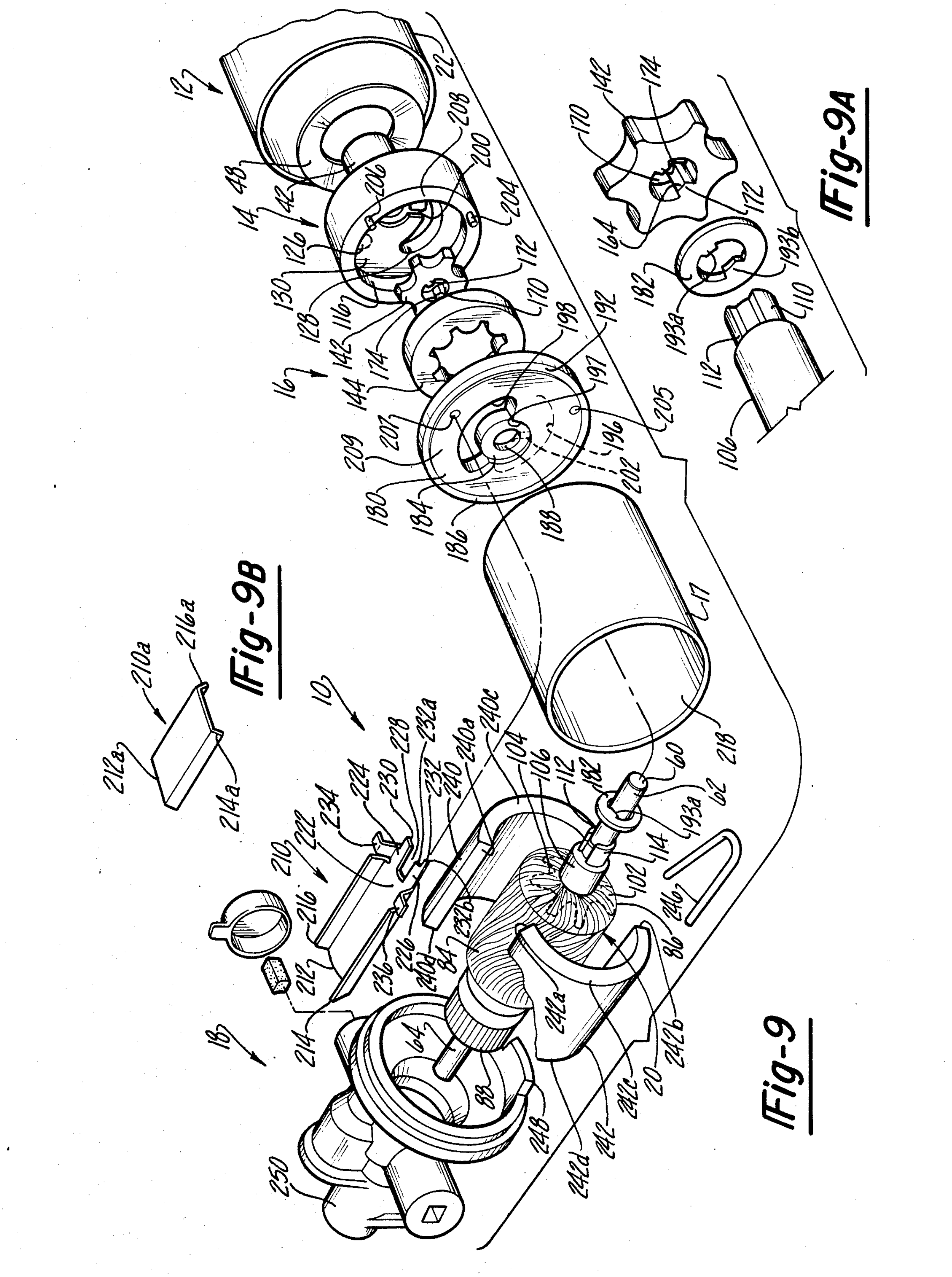
FIG. 9 is an exploded view, in perspective, of the gerotor fuel pump shown in FIGS. 1 through 8.
FIG. 9A is a perspective view of the coupling arrangement of the armature shaft and the inner gerotor pump gear of FIGS. 1 through 9.
FIG. 9B is a perspective view of an alternative less preferable embodiment of the keeper of FIGS. 7 and 9.

With reference now primarily to FIGS. 2 and 9, there is shown a wet motor gerotor pump assembly or pump 10 for receiving a fluid such as fuel, from a source such as a fuel tank (not shown), and delivering pressurized fluid to a utilization device, such as an internal combustion engine (not shown). The wet motor gerotor pump assembly or pump 10 includes a tubular stepped case 12 generally enclosing an inlet and pump housing 14, a gerotor pump assembly 16, a motor flux ring 17, a pump outlet plate 180, and being sealed against an outlet housing 18 with an electric motor assembly 20 supported between the inlet and pump housing 14 and the outlet housing 18.

The tubular stepped case 12 terminates at one end in a sealing lip 22 flanged inwardly to seal against an outwardly extending annular shoulder 24 of the outlet or port housing 18. Towards its other end, the tubular stepped case 12 includes an outer bore 26 generally defining a motor chamber 28, a pump bore 30 optionaly stepped inwardly from the outer bore 26 at an annular shoulder 32 and generally defining a pump chamber 34, and an inlet bore 36 stepped inwardly from both the outer and pump bores 26 and 30 and generally defining an inlet chamber 38. The inlet chamber 38 is adapted to be communicated in a known manner with a fuel source (not shown) such as by a known fluid coupling, conduit, and filter (not shown).

Made of a one-piece diecast zinc structure, the inlet and pump housing 14 has a cylindrical outer periphery 40 fitted into the pump bore in the pump chamber 34 of the tubular stepped case 12. At an inlet end thereof, the inlet and pump housing 14 terminates in a tubular hub 42 protruding into the inlet bore 36 and inlet chamber 38 of the tubular stepped case 12 and also has a stepped bore 44 of a structure and function to be described in greater detail hereinafter. The cylindrical exterior 45 of the tubular hub 42 is separated by an annular space 46 from an encircling annular spring washer 48 having an inner diameter portion 50 seated against an annular hub seat 52 protruding axially inwardly from the interior of the tubular stepped case 12. The annular spring washer 48 also has an outer diameter portion 54 captured axially and radially in an annular counterbore 56 formed on the inlet side 58 of the inlet and pump housing 14 just inboard of the cylindrical outer periphery 40 thereof.

The electric motor assembly 20 includes an armature shaft 60 having an armature shaft inlet end 62 and an armature shaft outlet end 64, each shaft end being rotatably supported by a respective tubular bushing or bearing 66 and 68 slip-fitted thereon and resiliently supported by O-rings 70 and 72, respectively, engaging a bore 74 in the inlet and pump housing 14 and a bore 76 in the outlet housing 18. The tubular bushing 66 is lubricated and cooled by fuel in the inlet chamber 38, and the tubular bushing 68 is lubricated by fluid fed through axial slots 75 spaced about the periphery of the bore 76. The armature shaft 60 is positioned generally along a central flow axis 78 through the wet motor gerotor pump assembly 10 and is positioned therealong by a thrust washer 182 being positioned against the thrust washer seat 184 which is part of the port plate 180 by meansof the magnetic attraction acting between magnets 240 and 242 and the armature shaft. The bearing 66 at the inlet is positioned by means of a shoulder 80 extending outwardly from the tubular bushing 66 and an annular shoulder 82 extending inwardly from the tubular hub 42 to thereby capture the O-ring 70 therebetween.

Adapted to rotate in the motor chamber 28, the electric motor assembly 20 includes an armature 84 made of a plurality of armature windings 86 wound through a plurality of slotted armature laminations (not shown) press fitted on a knurled portion (not shown) of the armature shaft 60. Each armature winding 86 has respective first and second ends terminated in a known manner at a commutator 88 adapted to electrically and slidingly engage a pair of diametrically opposed commutator brushes 90 and 92 electrically coupled to respective cup-shaped terminals 91 and 93. The brushes 90 and 92 are urged against the commutator 88 along a brush displacement axis 94 by a respective first and second brush spring 96 and 98.

Press fitted on the knurled portion of the armature shaft 60 axially outboard the opposite ends of the armature laminations are a first and a second end fiber 100 and 102, each having eight fingers 104 extending radially outwards from a fibrous central tubular hub 106 spaced equiangularly thereabout, each finger 104 having at its tip an axially extending tab 108 extending axially inwards towards the armature laminations to provide a stand off therefrom. The outward axial side of each finger 104 has a smooth curved outer surface therealong so as to non-abrasively engage and support the end loops of the armature windings 86. The fibrous central tubular hub 106 of the end fiber 102 has an annular thrust shoulder 110 extending radialy outwards therefrom and terminates axially in a pair of drive tangs or dogs 112 and 114, best seen in FIG. 9, in the form of diametrically-opposed arcuate sections extending axialy towards and into the inlet and pump housing 14.

As may be better understood with reference to FIGS. 2, 3, and 9, the inlet and pump housing 14 has a counterbore 116 opening towards the armature 84 and defining a gerotor cavity 118 and also has a central bore 120 therethrough. The counterbore 116, the gerotor cavity 118, and the central bore 120 are concentric about an offset axis 122, best seen in FIGS. 3 and 9, having a predetermined radial offset 124 from the central flow axis 78 along a first radial direction generally perpendicular to the brush displacement axis 94. As may be better understood with reference to FIGS. 2, 4, and 9, an oblong depression 126 and an oblong aperture 128 are provided in a bottom surface 130 of the counterbore 116 and are disposed generally concentrically about the central bore 120. As best seen in FIG. 4, the inlet side 58 of the inlet and pump housing 14 has an oblong inlet depression 132 extending axially therein. A first oblong inlet depression 132 on the inlet side 58 communicates with the oblong aperture 128 in the bottom surface 130 of the counterbore 116 and a second oblong inlet depression 136 on the inlet side 58 of the inlet and pump housing 14 which also communicates with the entire oblong aperture 128 in the bottom surface 130. The first and second inlet depressions 132 and 136 cooperate to provide unpressurized fluid to the gerotor cavity 118 for both priming the gerotor pump assembly 16 and providing fluid to be pressurized thereby.

Located in the gerotor cavity 118 of the gerotor pump assembly 16 are an inner pump gear 142 and an outer pump gear 144, shown only in Figure 3. The inner and outer pump gears 142 and 144 have respective series of inner and outer pump teeth 154 and 156 and pump teeth spaces 158 and 160 intervening therebetween. The inner pump teeth 154 of the inner pump gear 142 are formed to pumpingly seal and engage the outer pump teeth 156 and teeth spaces of the outer pump gear 144, while the outer pump teeth 156 of the outer pump gear 144 are formed to pumpingly seal and engage the inner pump teeth 154 and the teeth spaces 158 of the inner pump gear 142. The outer pump gear 144 has a cylindrical external periphery 162 that is slip-fittingly received by and positioned in the counterbore 116 of the gerotor cavity 118. The inner pump gear 142 has a central bore 164 therethrough which, as may be better understood with reference to FIGS. 2 and 5, has a tapered opening 166 facing the bottom surface 130 of the counterbore 116 of the inlet and pump housing 14. The internal diameter of the inner central bore 164 is slightly greater (e.g., 0.001 inches) than the external diameter of the armature shaft 60 passing therethrough and the axial length of the inner gear central bore 164 is selected to be comparatively short (e.g., 0.005 inches) with respect to the internal diameter thereof so as to allow the armature shaft 60 to pivot slightly end-to-end relative to the inner gear central bore 164 and thereby allow the O-ring 70 to self-align the armature shaft inlet end 62 in the bore 74 of the tubular hub 42. Such self-aligning allows the armature shaft 60 to effect small angles with respect to the central flow axis 78, such angles increasing with increasing manufacturing and assembling tolerances.

While thus allowed to self-align relative to the inner pump gear 142, the armature shaft 60, as better seen in FIGS. 3 and 9A, nevertheless drives the inner pump gear 142. The inner pump gear 142 has a pair of driven tangs or dogs 172 and 174 extending radially inwards therefrom into a drive coupling cavity 170. Forming a drive coupling 177, as best seen in FIGS. 3 and 9A, each of the drive tangs 112 and 114 have an included angle of approximately one hundred and eighteen degrees (118°), and each of the driven tangs 172 and 174 have an inclined angle of about fifty-eight degrees (58°). The four tangs 112, 114, 172 and 174 thereby have a total circumferential clearance of approximately eight degrees (8°). Such clearance allows sufficient circumferential play to permit easy assembly of the drive coupling but also slight axial misalignment thereof to allow the end-for-end self-alignment of the armature shaft 60 relative to the inner pump gear 142.

Completing the gerotor pump assembly 16 are an annular pump outlet or port plate 180 and a thrust washer 182 made of Teflon loaded Ultem. The pump outlet plate 180 has an annular thrust surface 184 counterbored into the outlet side 186 thereof and a bore 188 therethrough of a diameter sufficient to allow the drive tangs 112 and 114 of the fibrous central tubular hub 106 to freely pass therethrough with a suitable clearance (e.g., 0.005 inches). The annular pump outlet plate 180 also has a cylindrical outer periphery 190 and an annular radial groove 192 extending inboard therefrom, the outer peripheral surface 190 being received in the outer bore 26 of the tubular stepped case 12 and being seated against the face of the annular shoulder 32 therein providing both radial and axial positioning relative to the flux motor ring 17. The thrust washer 182 is pressed against the annular thrust surface 184 of the pump outlet plate 180 by the annular thrust shoulder 110 of the fibrous central tubular hub 106. The thrust washer 182 has a pair of diametrically-opposed arcuate tangs or dogs 193a and 193b extending radially inward to engage and be driven by the dogs 112 and 114 of the fibrous central tubular hub 106.

On an axial side facing the inner and outer pump gears 142 and 144, the pump outlet plate 180 also has an oblong depression 196 and outlet aperture 198 generally matching the shape and position of the oblong depression 126 and the oblong aperture 128 in the bottom surface 130 of the counterbore 116 of the gerotor cavity 118 of the inlet and pump housing 14. To afford proper pump priming and other desirable pumping characteristics, the oblong aperture 128 and the oblong depression 196 are communicated through, the bores 120 and 188 by appropriate radial slots 200 and 202, as best seen in FIGS. 2 and 9. Moreover, to provide a suitable outlet port for fluid pumped to a fluid pressure in the gerotor cavity 118, the annular pump outlet plate 180 has the oblong outlet aperture 198 formed therethrough and positioned and shaped to correspond with the oblong depression 126. To properly position the pump outlet plate 180 circumferentially with respect to the inlet and pump housing 14, a pair of locator pins 204 and 206 are affixed thereto to extend axially from an annular radial surface 208 to engage suitable holes 205 and 207 through an annular radial surface 209 of the pump outlet plate.

Figure 7:
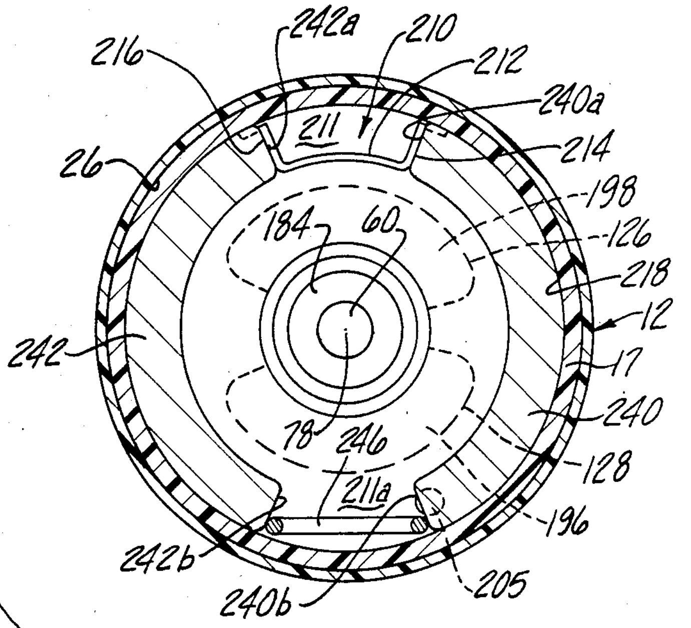
FIG. 7 is a view of the gerotor fuel pump of FIG. 2 taken along line 7—7 thereof.

Pressure fluid from the oblong outlet aperture 198 of the pump outlet plate 180 is guided therefrom and protected from the windage effects of the armature 84 by a tunnel and magnet keeper device 210, best seen in FIGS. 7 and 9. The tunnel and magnet keeper device 210 consists of a first flow channel or passage 211 shielded from the armature windage extending substantially the entire axial length of the motor chamber 28 between the pump outlet plate 180 and the annular shoulder 24 of the outlet housing 18. Shaped generally in the form of an inverted staple, the tunnel and magnet keeper device 210 has a central bridge portion 212 bounded by a pair of leg portions 214 and 216. The central bridge portion 212 has a slightly convex shape, as seen from a point external to the pump, to match the circular contour of the periphery of the armature 84, and the pair of leg portions 214 and 216 extend radially outwards from the central bridge portion 212 to seat on an inner peripheral surface 218 of the cylindrical magnetic motor flux ring 17. The flux ring 17 also extends substantially the entire axial length between the pump outlet plate 180 and the outwardly extending annular shoulder 24 of the outlet housing 18.

To allow substantially unimpeded flow of pressure fluid from the oblong outlet aperture 198 into the tunnel and magnet keeper device 120 while also imparting a desired circumferential position to this device, the inlet end 222 thereof is provided with two axially extending protrusions 224 and 226 spaced radially apart to provide fluid entrance 228 therebetween. The axial protrusion 224 terminates in a butt end 230 abutting directly against the annular radial surface 209 of the pump outlet plate 180. The axial protrusion 226 terminates in a stepped tab 232 having a butt end *232a* abutting against the annular radial surface 209 and a pin portion *232b* extending into the outlet side of the hole 207 provided to properly orient the pump outlet plate 180 with the inlet and pump housing 14 as aforementioned.

The leg portions 214 and 216 of the tunnel and magnet keeper device 210 cooperate with a pair of tabs 234 and 236 extending circumferentially outwards from the respective axial protrusions 224 and 226 to properly position the pair of crescent shaped motor magnets 240 and 242 both circumferentially and axially with respect to the armature 84. As may be better understood with reference to FIGS. 7, 8 and 9, each crescent shaped motor magnet 240 and 242 is bounded along its axial length by a first and a second set of juxtaposed axial surfaces *240a*, *240b*, *242a* and *242b*, and each motor magnet 240 and 242 is bounded at its inlet and outlet ends by respective end surfaces *240c*, *242c*, *240d* and *242d*.

In assembly, the tunnel and magnet keeper device 210 is first inserted so that the pin portion *232b* thereof is positioned in the locator hole 207 of the pump outlet plate 180. Thereafter, the crescent-shaped motor magnets 240 and 242 are inserted so that the axial surfaces *240a* and *242a* respectively about the leg portions 214 and 216 and the end surfaces *240c* and *242c* abut the tabs 234 and 236. To properly space the motor magnets 240 and 242 from the outlet port plate 180 and provide a second axial channel *211a* therebetween, a V-shaped compression spring 246 is then inserted between the second set of juxtaposed axial surfaces *240b* and *242b* to urge the axial surfaces *240a* and *242a* circumferentially into abutting contact with the leg portions 214 and 216 of the tunnel and magnet keeper device 210.

Figure 8:
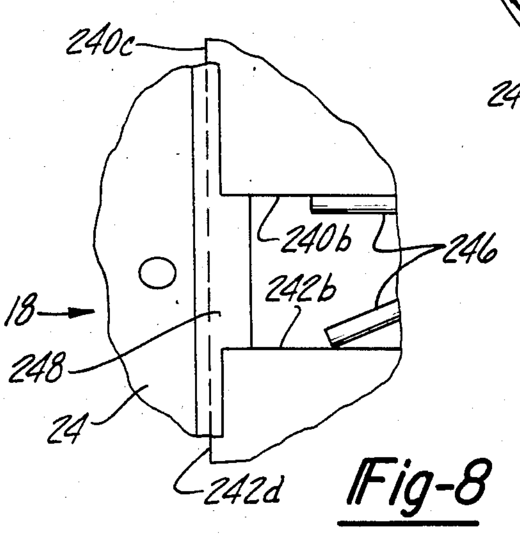
FIG. 8 is a fragmentary plan view of a portion of FIG. 2 showing the orientation of the outlet housing by the use of an indexing tab positioned between the two motor magnets.

Finally, the outlet housing 18 is inserted into the tubular stepped case 12. The circumferential orientation of the outlet housing 18 is determined relative to the tunnel and magnet keeper device 210, as best seen in FIG. 8, by an arcuate tab 248 extending between the axial surfaces *240b* and *242b* of the crescent shaped motor magnets 240 and 242. A pump outlet port or fitting 252 through the outlet housing 18, is thereby aligned along the same axial plane intersecting the center of the tunnel and magnet keeper device 210 and the center of the outlet aperture 198 through the pump outlet plate 180.

The foregoing proper circumferential orientation of the outlet housing 18 relative to the tunnel and magnet keeper device 210 permits a flow of pressurized fluid smoothly therethrough directly from the outlet aperture 98, through the first flow passage 211, to the pump outlet port 252 of the outlet housing 18.

It has been found through experimental test results, under standard conditions, that the foregoing apparatus substantially improves pump peformance. Compared with wet pumps of similar size and capacity, the foregoing wet motor pump assembly provided the desired fluid pressure at substantially increased flow rates with substantially decreased armature currents. For example, in one typical application to a conventional passenger car internal combustion engine, flow rates were uniformly increased by at least three gallons per hour while the corresponding armature currents were decreased at least twelve percent (12%).

Some portion of this improvement is attributed to merely providing the axial flow channel, such as the magnet keeper 210*a* of the type shown in FIG. 9B. Such a keeper has a central bridge portion 212*a* abutting radially outwards against the flux ring 17 and bounded by a pair of leg portions 214*a* and 216*a* opening radially inwards towards the armature 84. However, such a keeper would allow the armature windage to induce radially oriented hydraulic curls in the flow channels 211. But such turbulence would reduce the effective cross-sectional area of the axial flow channel 211 to a small portion of the actual cross-sectioned area thereof. To avoid such curls and turbulence and substantially increase the effective area, the tunnel and magnet keeper device 210 of the preferred embodiment is provided so that the central bridge portion 212 thereof shields the flow therethrough from the armature windage. Should further improvements be desired to avoid hydraulic curls induced with an orientation in the channel 211 by the flow restriction imposed by the circumferential width thereof, the channel 211 could be further subdivided into subchannels of a plurality of tubes or slots. Such subchannels would provide a laminar flow substantially increasing the effective cross-sectional area of the flow to the actual cross-sectional area of the channel.

Figure 6:
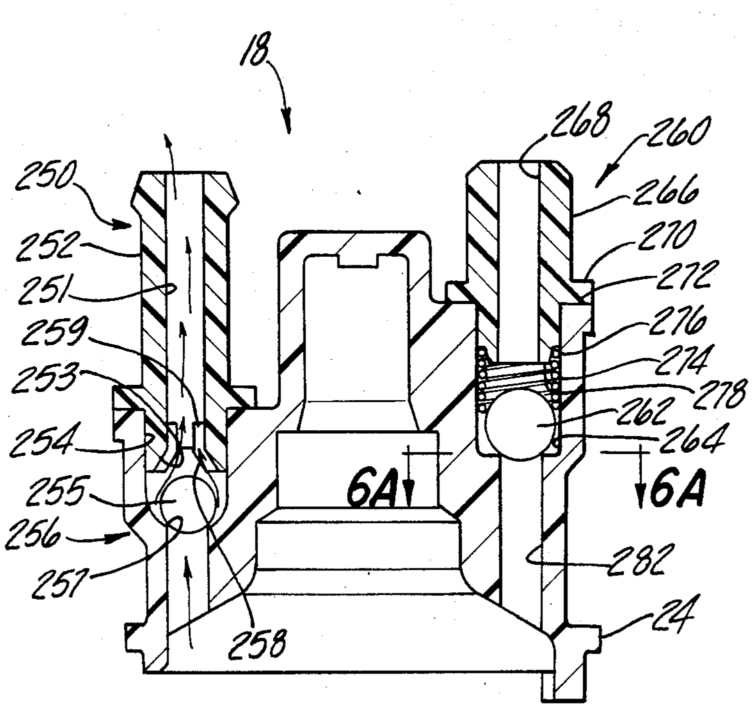
FIG. 6 is a cross-sectional view of the outlet housing with an outlet check valve and vent valve of the gerotor fuel pump of FIG. 1 taken along line 6—6 thereof.

As best seen in FIGS. 1 and 6, the outlet housing 18 made of a molded plastic such as Ultem, includes the pump outlet valve 250 with the tubular outlet port or fitting 252 adapted to be coupled to an internal combustion engine. The tubular outlet fitting 252 has an internal outlet passage 251 with a slotted seal 253 fitted into an outlet bore 254 to enclose a ball valve 255 of a one-way check valve 256 therein. The outlet housing 18 provides an annular seat 257 cooperating with the ball valve 255 to provide the one-way check valve 256 which serves to prevent backflow from the engine into the pump. To allow normal flow from the pump 10 to the engine, the tubular outlet fitting 252 terminates in four tapered prongs 258 forming slots 259 therebetween, the tapered prongs 258 normally restraining the outward movement of the ball valve 255 and the slots 259 allowing the fuel to flow out therebetween. The angle formed by the tapered prongs 258 is such as to cradle the ball valve 255 so as to prevent oscillation of the ball at certain flow rates.

Figure 6A:
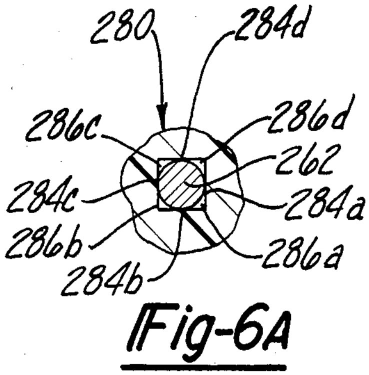
FIG. 6A is cross-sectional view of an imperfect valve seat and ball valve of the vent valve of FIG. 6 taken along line 6A—6A thereof.

A further feature of the wet motor pump assembly is a vapor vent valve 260 provided in the outlet housing 18, as best seen in FIGS. 6 and 6A. The vapor vent valve 260 is located diametrically opposite the outlet valve 250, and includes a ball 262 enclosed in a valve bore 264 by a tubular vent fitting 266 having a vent passage 268 therethrough and having an annular hub 270 seated against an annular seating surface 272 of the outlet housing 18. A helical spring 274 biases the ball 262 away from a shoulder 276 encircling an annular internal hub 278 of the tubular vent fitting 266 and towards an imperfect seal in the form of a square seat 280, best seen in FIG. 6A, at the end of a vent bore 282 formed in the outlet housing 18. When in contact with the square seat 280, the ball 262 touches the square seat 280 at only four points 284*a*, 284*b*, 284*c*, and 284*d*, such arrangement providing four suitable bypass passages 286*a*, 286*b*, 286*c*, and 286*d*. With this arrangement, a vapor pressure developed by the gerotor pump assembly 16, especially during self-priming thereof, is unloaded through the bypass passages 286*a*, 286*b*, 286*c*, and 286*d* until liquid reaches the output side of the pumping elements and the vent bore 282. Thereafter, the fluid pressure on the ball 262 will overcome the bias thereon by the helical spring 274 to seat the ball 262 on the annular internal hub 278 formed at the inboard end of the tubular vent fitting 266, thereby closing the vent passage 268 and allowing normal pumping operation and outlet through the outlet port 252.

The square seat 280 in the foregoing vapor vent valve 260 may be replaced by other suitable non-circular, or imperfect, valve seats including, for example, partially-circular valve seats as might be effected by a circular valve seat having axially extending slots therethrough.

Figure 10:
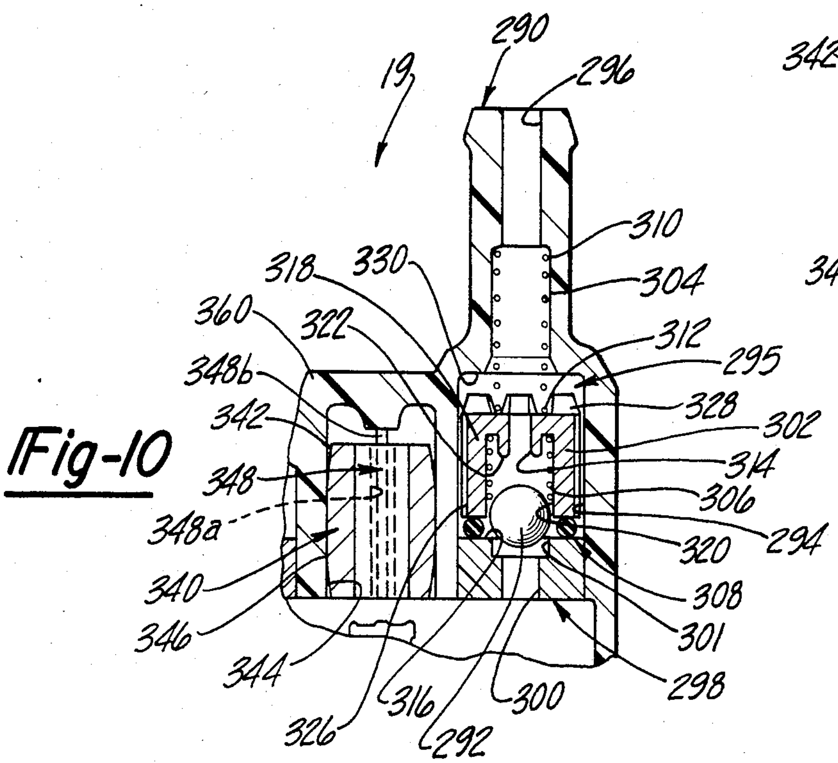
FIG. 10 is a partial sectional view of a portion of an alternative outlet housing, showing a vent-relief valve and a bushing for rotatably supporting an end portion of the armature shaft.
Figure 11:
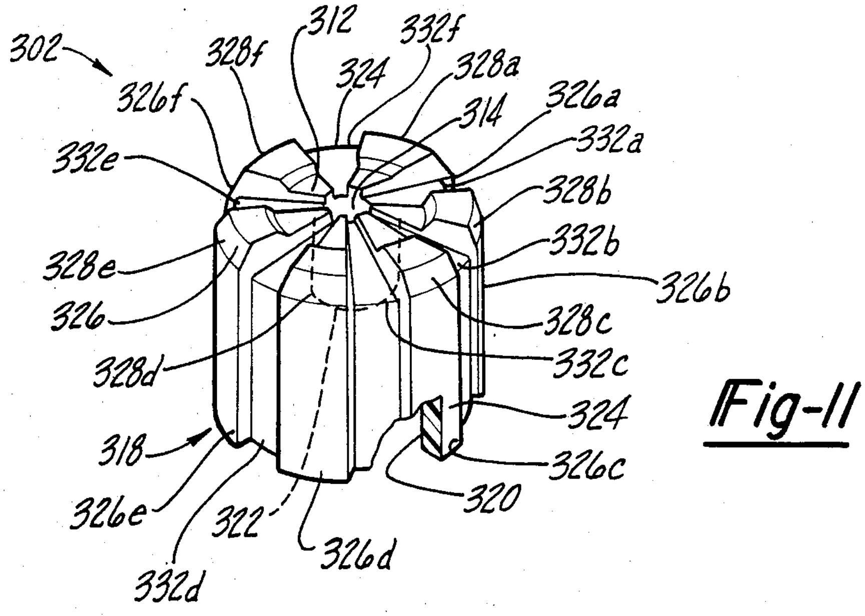
FIG. 11 is a perspective view of a pop-off valve of the ventrelief valve shown in FIG. 10.

A further application of an imperfect valve seat is in combination with a vent-relief valve 290 shown molded into the alternate outlet housing 19 in FIGS. 10 and 11. As may be better understood with reference thereto, a ball 292 is enclosed in a bore 294 provided in the outlet housing 19, the bore 294 defining therein a valve chamber 295. One end of the bore 294 is in constant communication with a vent-relief passage 296 provided through the end of the outlet housing 19, and the other end of the bore 294 is suitably secured, such as by ultrasonic welds, to a valve seat member 298 having a central passage 300 therethrough in constant communication with the motor chamber 28. The central passage 300 opens into an oblong valve seat 301 in the form of an oblong counterbore having a width equal to the diameter of the central passage 300 and a length twice thereof. When in contact with the valve seat member 298, the ball 292 can contact the oblong valve seat 301 either at two diametrically opposite points if centrally located thereon, or in a semi-circle line contact if shifted to either extreme side thereof. Either way, there is a bypass passage constantly open between the ball 292 and the oblong valve seat 301.

Also located in the valve chamber 295 formed by the bore 294 and the valve seat member 298 is a tubular pop-off or relief valve 302, a first helical spring 304, a second helical spring 306, and an O-ring 308. One end of the first helical spring 304 is biased against an annular shoulder 310 formed in the vent-relief passage 296, and the other end of the first helical spring 304 is biased against an annular top surface 312 formed at the top of the popoff valve 302 and encircling a central vent passage 314 therethrough. The first helical spring 304 biases the tubular pop-off valve 302 to normally seat and seal against the O-ring 308; the O-ring 308 being normally seated on an annular seat surface 316 provided on the valve seat member 298 about the oblong valve seat 301 therethrough. When the pop-off valve 302 is, thus, normally urged against the O-ring 308 to seal against the annular seat surface 316, a normally-open bypass passage is established from the central passage 300 of the valve seat member 298, through the central vent passage 314 of the popoff valve 302, and the vent-relief passage 296 of the outlet housing 19. This vent bypass passage is closed, as will be described, when the pump assembly 10 produces a fluid pressure in excess of a predetermined maximum venting pressure in the form of a liquid at the ball 292.

The tubular pop-off valve 302 also has an externally slotted tubular portion 318 having a tube bore 320, at one end clearing the outer diameter of the ball 292 and having an annular hub seat 322 depending internally from the other end. One end of the second helical spring 306 is seated about the annular hub seat 322, and the other end engages a peripheral surface of the ball 292 to normally urge the ball 292 to seat on the oblong valve seat 301. However, when the fluid pressure experienced by the pump 10 exceeds the maximum venting pressure, such excess pressure overcomes the bias of the second helical spring 306 on the ball 292 and moves the ball 292 towards the annular hub seat 322, seating on the same when the pump pressure exceeds the predetermined maximum venting pressure. At pump pressures between the maximum venting pressure and a predetermined relief pressure, the ball 292 closes the fluid passage between the central passage 300 and the vent-relief passage 296.

To provide a relief capability or condition when the pump experiences a fluid pressure in excess of the predetermined relief pressure, the axial periphery 324 of the pop-off valve 302 is provided with six ribs *326a*, *326b*, *326c*, *326d*, *326e*, and *326f*, extending radially outwards and spaced equiangularly thereabout on the slotted tubular portion 318, the ribs *326a* through *326f* also guiding and centrally positioning the pop-off valve 302 with respect to the bore 294. Each of the axial ribs *326a* through *326f* is contiguous with a respective spacer tab *328a* through *328f* upstanding axially from and about the annular top surface 312 and the central vent passage 314 therethrough. The tabs *328a* through *328f* are adapted to abut against and space the remainder of the pop-off valve 302 axially from an annular stop surface 330 counterbored in the outlet housing 19 about the vent-relief passage 296. The ribs *326a* through *326f* and the respective tabs *328a* through *328f* form passages or slots *332a* through *332f* therebetween spaced equiangularly about the axial periphery 324 of the pop-off valve 302. The slots *332a* through *332f* cooperate with the vent-relief passage 296 to continually communicate the entire space between the bore 294 and the axial periphery 324 of the pop-off valve 302 with the vent-relief passage 296. However, this space is not communicated with the central passage 300 until the pump experiences a fluid pressure in excess of the relief pressure, such excess pressure then overcoming the seating bias of the helical spring 304 against the O-ring 308 to thereby move the pop-off valve 302 away from the annular seat surface 316 and towards the annular stop surface 330. Such excess pump pressure thereby urges the pop off valve away from the O-ring 308 to unseat from the annular seat surface 316 thereby opening a passage through the slots *332e* through *332f* from the central passage 300, between the bore 294, the axial periphery of 324 of the pop-off valve 302, through the slots *332a* through *332f*, and out through the vent-relief passage 296.

Figure 10A:
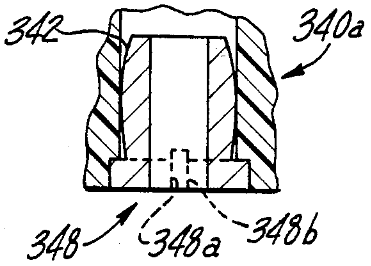
FIG. 10A is a perspective view of portions of an alternate version of the support bushing and outlet housing of FIG. 10 showing the slot and key arrangement thereof for limiting circumferential rotation of the bushing.

Further alternate features of the pump 10, as shown in FIGS. 10 and 10A are alternate tubular bushings 340 and *340a*, the axial length of which has a convex form or raised portion in the shape of an outwardly extending bowl or crown 342 that contacts a bore 344 in the outlet housing 19 to allow a slight end-for-end self-alignment of the armature shaft 60. To restrain the tubular bushing from rotating in the bore 344, an anti-rotation device is provided in the form of a slot and key arrangement 348 wherein a slot *348a* in the tubular 340 is circumferentially somewhat wider and radially somewhat deeper than a key *348b*.

A further feature of the wet motor gerotor pump 10 is the utilization of otherwise existing structure in the alternate outlet housing 19 in combination with additional passages formed therein to cool and lubricate a portion of the tubular bushing 340 between the point of contact of a raised portion 346 with the bore 344 and a roof 360 of the outlet housing. As may be better understood with reference to the outlet housing 19 shown in FIGS. 10 through 16, a bearing lubrication and cooling system 350 in the form of a flow network 354 is provided between a raised cap portion 352, a cylindrical peripheral surface 89 of the commutator 88, the bore 344, and a pair of brush support ridges 356 and 358 for supporting the brushes 90 and 92 respectively.

As best seen in FIG. 12, the raised cap portion 352 includes the generally flat roof 360 supporting the outlet valve 250 and the vent-relief valve 290 hose fitting, and further includes a pair of side walls 362 and 364, and a pair of curved end walls 366 and 368.

The flow network 354, when viewed in the transverse radial plane of FIG. 13, is shaped generally in the form of the Roman numeral X. More particularly, the flow network 354 includes four branches 370, 372, 374, and 376, each in the shape of a dog leg and each communicating with the axial length of the bore 344 as well as an annular recess 378 encircling a stop hub 380 projecting into the bore 344 from the roof 360. Each of the branches 370 through 376 extends axially along the bore 344 to the inner surface 361 of the roof 360. Each includes a side wall branch portion *370a*, *372a*, *374a*, and *376a*. Each such side wall branch portion is generally parallel to one of the side walls 362 and 364, with the side wall branch portions *370a* and *372a* generally spanning the vent-relief valve 290 while the side wall branch portions *374a* and *376a* generally span the outlet port 252. Each of the branches 370, 372, 374, and 376 also include a radial branch portion *370b*, *372b*, *374b*, and *376b*, each terminating in a respective side wall branch portion with a respective radial slot *370c*, *372c*, *374c*, and *376c* formed circumferentially through a bore wall 382 providing the bore 344.

The brush support ridges 356 and 358 includes an arcuate ridge crown or wall element *356a* and *358a* facing radially inward, the arcuate ridge crown *356a* being bounded by a pair of radial ridge side walls *356b* and *356c* while the arcuate ridge crown wall *358a* is bounded by a pair of radial ridge side walls *358b* and *358c*. Each set of the radial ridge side walls *356b*, *356c*, *358b*, and *358c* are spaced radially apart by an included angle of about ninety degrees (90°) and, together with their respective arcuate ridge crown walls *356a* and *358a*, extend axially to an arcuate ridge wall counterbore 384 at a depth corresponding with the axial width of the commutator 88. The arcuate ridge crown or walls 356*a* and 358*a* are of a diameter slightly greater than that of the commutators 88 to allow clearance therebetween for appropriate brush commutator interaction. The bore 344 commences at the depth of the arcuate ridge counterbore 384 and extends axially to the inner side 361 of the roof 360. With the bore 344 starting below the brush support ridges 356 and 358, there is an arcuate opening of approximately ninety degrees (90°) between the radial ridge side walls of the opposing brush support ridges 356 and 358. In other words, there is a circumferential gap of about ninety degrees (90°) extending the axial length of the commutator 88 between the radial ridge side walls 356 and 358*b* and a similar gap extends circumferentially between the radial ridge side walls 356*c* and 358*c*.

Assuming that the armature 84 is energized to rotate in a counterclockwise direction as viewed in FIG. 13, the cylindrical peripheral surface 89 of the commutator 88 viscously drags fluid therewith, such fluid being picked up by the rotation of the commutator at the radial slots 376*c* and 372*c* having, respectively, the radial ridge side walls 356*c* and 358*b* and being delivered or thrown off against the next radial ridge side walls 358*c* and 356*c*, respectively, of the radial slots 374*c* and 370*c*. The fluid picked up at the diametrically opposite radial ridge side walls 356*c* and 358*b*, therefore experiences a higher velocity than the fluid impacting and collecting at the diametrically opposite radial ridge side walls 356*b* and 358*c*. This difference in velocities causes the fluid in the radial slot 370*c* and 374*c* to move slower and therefore be at a pressure higher than the fluid at the radial slot 372*c* and 376*c*. A similar pressure differential could be effected by other structures, such as a vane or other form of flow resistance, the ridge walls in the present embodiment serving a dual function of supporting the brushes while also providing the necessary pressure differential.

In any event, the resulting pressure differential created by the drag forces of the commutator cylindrical peripheral surface 89 on the fluid at the indicated radial ridge side walls effects a pumping action of fluid in the radial branch portions 370*b* and 374*b*. Such pumping action is axially outwards towards the inner surface 361 of the roof, then radially inwards into the annular recess 378, then axially about the tubular bushing 340, then radially outwards from the annular recess 378, and finally back through the opposing radial branch portions 372*b* and 376*b*. In other words, the commutator cylindrical 89, the peripheral surface brush support ridges 356 and 358, and the flow network 354 establish two parallel pumping chambers or circuits separated by the commutator 88 but joined at the annular recess 378. The pressure differentials created by the difference in velocities at the indicated radial ridge side walls provides two incoming and two outgoing flows of fluid thereat, both flows combining to cool and lubricate the tubular bushing 340 and the bore 344. With such cooling and lubrication, the life of the upper tubular bushing 340 has been found to be significantly increased over the life of the same bearing without such lubrication and cooling. Moreover, an acceptable lubrication will also occur by providing just a single circuit communicating with the annular recess 378 communicating with the upper end portion of the tubular bushing 340 above the point its crown 342 contacts the bore 344. Such lubrication would be less than that provided by the dual parallel circuit shown. Also, a slight flow of fluid might be provided by such a single circuit should the internal structure by happenstance provide a sufficient pressure differential between the inlet and the outlet to the annular recess 378, without the benefit of additional pressure building structures.

Although the best mode contemplated by the inventor for carrying out the present invention as of the filing date hereof has been shown as described herein, it will be apparent to those skilled in the art that suitable modifications, variations, and equivalents may be made without departing from the scope of the invention. This invention is to be limited solely by the terms of the claims appended hereto.

What is claimed is:

1. A wet motor gerotor pump for pumping a liquid of low electrical conductivity from a liquid source, said pump comprising:

a pump case having one end, an opposite end and a flow axis therethrough, said pump case further comprising an inlet end bore at said one end adapted to communicate with said liquid source and means for sealing said pump case;

an inlet chamber adjacent sid inlet end bore;

a motor chamber located in said opposite end of said pump case;

a pump chamber interposed said motor chamber and said inlet chamber;

inlet housing means mounted in said pump chamber, said inlet housing means comprising an annular hub protruding into said inlet chamber, said inlet housing means further comprising a gerotor cavity having a gerotor outlet port, said gerotor cavity disposed about a gerotor axis located parallel to and displaced a predetermined distance in an eccentric radial direction from said flow axis;

outlet housing means having pump outlet means adapted to communicate liquid from said pump and further comprising a second means for sealing coupled to said means for sealing said pump case to said outlet housing means, said outlet housing means further comprising vapor vent means;

gerotor pump means located in said gerotor cavity, said gerotor pump means comprising an inner pump gear, an outer pump gear, and means for driving said inner and outer pump gears, said gerotor pump means further comprising a locating hole spaced from said gerotor axis; and electric motor means comprising armature means comprising an armature shaft with a first and a second end rotatably supported, respectively, at said inlet housing means and said outlet housing means, said armature means further comprising drive hub means having an axially extending portion, said electric motor means further comprising means for separating said liquid from said armature means as said liquid flows from said gerotor cavity to said outlet housing means, said means for separating further comprising keeper means defining a first axial flow passage between said gerotor cavity and said outlet housing means substantially along said flow axis, said keeper means comprising first and second spaced apart protrusions extending axially, said first and second spaced apart protrusions defining a fluid entrance therebetween, one of said first and second spaced apart protrusions abutting said pump chamber, the other of said first and second spaced apart protrusions having an end with a first step and a second step, one of said first step and said second step abutting against said pump chamber, the other of said first and said second step extending into said locating hole in said gerotor pump means, such that said keeper means establishes said first axial flow passage past said armature means substantially free of turbulence and flow restrictions to thereby allow liquid to be pumped at substantially higher flow rates at armature currents substantially lower than without said means for separating, whereby said first axial flow passage allows liquid to be pumped about said armature means and to thereby improve pumping efficiency;

whereby said gerotor pump means pumps liquid from said source through said inlet chamber, past said gerotor cavity through said gerotor outlet port into said motor chamber, then along said means for separating said liquid from said armature means into said outlet housing means, said vapor vent means permitting vapor to vent from said gerotor pump means for a predetermined period, said vapor vent means further terminating the venting of vapor upon the pumped liquid being communicated to said vapor vent means.

2. The wet motor gerotor pump of claim 1 wherein said one of said inner and outer pump gears has a coupling cavity and wherein said drive hub means extends axially into said coupling cavity to couple said drive hub means to said inner and outer pump gears.

3. The wet motor gerotor pump of claim 1, further comprising a first and a second bearing means for rotatably supporting said first and second ends of said armature shaft, respectively, in said inlet housing means and said outlet housing means, each of said first and second bearing means comprising a resilient mounting means to allow said armature shaft to have an axial alignment offset from said flow axis.

4. The wet motor gerotor pump of claim 3, wherein said first end of said armature shaft has an outer shaft diameter and protrudes through a bore in said inner pump gear, said bore of said inner pump gear having a bore diameter and a predetermined bore length to allow said armature shaft to pivot within a predetermined angular range with respect to said flow axis, whereby said resilient mounting means and said predetermined angular range cooperate to allow self-alignment of said armature shaft with respect to said flow axis.

5. The wet motor gerotor pump of claim 1, wherein said electric motor means further comprises:

first and second magnet means, each of said first and second magnet means further comprising an inner and an outer axial surface extending in a direction along said flow axis about said armature means, a first and a second side surface extending in a direction along said flow axis, and a first and a second end surface; and magnet spacing means positioned between said first and second magnet means for spacing said first and second side surfaces of said first magnet means circumferentially with respect to said first and second side surfaces of said second magnet means.

6. The wet motor gerotor pump of claim 5, wherein said means for separating said liquid from said armature means comprises keeper means separating one of said first and second side surfaces of said first magnet means from one of said first and second side surfaces of said second magnet means to define a first axial flow passage between said gerotor pump means and said outlet housing means and between said first and second magnet means substantially along said flow axis, such that said keeper means establishes said first axial flow passage past said armature means substantially free of turbulence and flow restrictions and to thereby allow liquid to be pumped at substantially higher flow rates at armature currents substantially lower than without said means for separating;

whereby said axial flow passage allows liquid to be pumped about said armature means and to thereby improve pumping efficiency and performance.

7. The wet motor gerotor pump of claim 6, wherein said means for separating said liquid from said armature means further comprises spring means circumferentially biasing the other of said first and second side surfaces of said first magnet means from the other of said first and second side surfaces of said second magnet means to establish a second axial flow passage extending along said flow axis between said first and second magnet means.

8. The wet motor gerotor pump of claim 6 wherein said keeper means comprises tunnel means having a central bridge portion bounded by a first leg portion and a second leg portion, said bridge portion of said central tunnel means radially separating said first axial flow passage from said armature means, each said leg portion extending radially outwards from said central bridge portion and separating said one of said first and second side surfaces of said first magnet means from said one of said first and second side surfaces of said second magnet means.

9. The wet motor gerotor pump of claim 8 wherein:

said armature means has an axial armature length and said central bridge portion of said tunnel means extends axially along said armature length;

said tunnel means further comprises an extension portion extending axially towards said gerotor pump means and adapted to abut thereagainst; and said first and second leg portions each comprises tab means interposed said gerotor pump means and one of said first and second end surfaces of each of said first and second magnet means;

whereby said tab means cooperate with said extension portion to axially space said first and second magnet means a predetermined axial distance from said gerotor pump means so as to allow liquid to flow into said first and second axial flow passages.

10. The wet motor gerotor pump of claim 1, wherein said gerotor pump means comprises a gerotor port plate having an outlet port therethrough spaced from said flow axis and communicating with said gerotor cavity, and wherein said first axial flow passage is circumferentially aligned with said outlet port of said gerotor port plate.

11. The wet motor gerotor pump of claim 1, wherein said gerotor pump means further comprises a gerotor port plate fixed circumferentially to said inlet housing means and wherein said means for separating said liquid from said armature means is fixed circumferentially to said gerotor port plate.

12. The wet motor gerotor pump of claim 6, wherein said outlet housing means further comprises a tab portion protruding between said other of said first and second side surfaces of each of said first and second magnet means to thereby locate the circumferential position of said first and second magnet means and thereby said first axial flow passage therebetween relative to said gerotor outlet port and said outlet housing means.

13. The wet motor gerotor pump of claim 1, wherein said vapor vent means comprises:

a vent passage;

an imperfect vent seat spaced about said vent passage;

a seal seat spaced a predetermined distance from said imperfect vent seat;

a ball valve member interposed said imperfect vent seat and said seal seat; and a spring interposed said ball valve member and said seal seat;

such that said seal seat, said imperfect vent seat and said ball valve member establish a vent bypass passage therebetween when said ball valve member is seated on said imperfect vent seat, said spring biasing said ball valve member against said imperfect vent seat and thereby venting said motor and outlet chambers until said fluid pressure exceeds a predetermined fluid pressure, and said ball valve member seating on said seal seat to prevent said venting and to seal said motor and outlet chambers when said fluid pressure exceeds said predetermined fluid pressure.

14. A wet motor gerotor pump for pumping a liquid of low electrical conductivity from a liquid source, said pump comprising:

a pump case having one end, an opposite end and a flow axis therethrough, said pump case further comprising an inlet end bore at said one end adapted to communicate with said liquid source and means for sealing said pump case;

an inlet chamber adjacent said inlet end bore;

a motor chamber located in said opposite end of said pump case;

a pump chamber interposed said motor chamber and said inlet chamber:

inlet housing means mouned in said pump chamber, said inlet housing means comprising an annular hub protruding into said inlet chamber, said inlet housing means further comprising a gerotor cavity having a gerotor outlet port, said gerotor cavity disposed about a gerotor axis located parallel to and displaced a predetermined distance in an eccentric radial direction from said flow axis;

outlet housing means having pump outlet means adapted to communicate liquid from said pump and further comprising a second means for sealing coupled to said means for sealing said pump case to said outlet housing means, said outlet housing means further comprising vapor vent means;

electric motor means comprising:

armature means comprising an armature shaft with a first and a second end rotatably supported, respectively, at said inlet housing means and said outlet housing means, said armature means further comprising drive hub means having an axially extending portion; and first and second magnet means, each of said first and second magnet means further comprising an inner and an outer axial surface extending in a direction along said flow axis about said armature means, a first and a second side surface extending in a direction along said flow axis, and a first and a second end surface;

gerotor pump means located in said gerotor cavity, said gerotor pump means comprising an inner pump gear, an outer pump gear, and means for driving said inner and outer pump gears, said gerotor pump means further comprising a locating hole spaced from said gerotor axis;

means for separating said liquid from said armature means as said liquid flows from said gerotor cavity to said outlet housing means, said means for separating said liquid from said armature means comprising keeper means separating one of said first and second side surfaces of said first magnet means from one of said first and second side surfaces of said second magnet means to define a first axial flow passage between said gerotor cavity and said outlet housing means and between said first and second magnet means substantially along said flow axis, said keeper means comprising first and second spaced apart protrusions extending axially therefrom, said first and second spaced apart protrusions defining a fluid entrance therebetween, one of said first and second spaced apart protrusions abutting against said pump chamber, the other of said first and second spaced apart protrusions having an end with a first step and a second step, one of said first step and said second step abutting against said pump chamber, the other of said first step and said second step extending into said locating hole in said gerotor pump means, such that said keeper means establishes said first axial flow passage past said armature means substantially free of turbulence and flow restrictions to thereby allow liquid to be pumped at substantially higher flow rates at armature currents substantially lower than without said means for separating, whereby said first axial flow passage allows liquid to be pumped about said armature means and to thereby improve pumping efficiency and performance; and magnet spacing means positioned between said first and second magnet means for spacing said first and second side surfaces of said first magnetmeans circumferentially with respect to said first and second side surfaces of said second magnet means;

whereby said gerotor pump means pumps liquid from said source through said inlet chamber, past said gerotor cavity through said gerotor outlet port into said motor chamber, then along said means for separating said liquid from said armature means into said outlet housing means, said vapor vent means permitting vapor to vent from said gerotor pump means for a predetermined period, said vapor vent means further terminating the venting of vapor upon the pumped liquid being communicated to said vapor vent means.

15. The wet motor gerotor pump of claim 1, wherein said means for separating said liquid from said armature means further comprises spring means circumferentially biasing the other of said first and second side surfaces of said first magnet means from the other of said first and second side surfaces of said second magnet means to establish a second axial flow passage extending along said flow axis between said first and second magnet means.

16. The wet motor gerotor pump of claim 1, wherein said keeper means comprises tunnel means having a central bridge portion bounded by a first leg portion and a second leg portion, said central bridge portion of said tunnel means radially separating said first axial flow passage from said armature means, each said leg portion extending radially outwards from said central bridge portion and separating said one of said first and second side surfaces of said first magnet means from said one of said first and second side surfaces of said second magnet means.

17. The wet motor gerotor pump of claim 16 wherein:

said armature means has an axial armature length and said central bridge portion of said tunnel means extends axially along said armature length;

said tunnel means further comprising an extension portion extending axially towards said gerotor pump means and adapted to abut thereagainst; and said first and second leg portions each comprises tab means interposed said gerotor pump means and one of said first and second end surfaces of each of said first and second magnet means;

whereby said tab means cooperate with said extension portion to axially space said first and second magnet means a predetermined axial distance from said gerotor pump means so as to allow liquid to flow into said first and second axial flow passages.

18. The wet motor gerotor pump of claim 1, wherein said outlet housing means further comprises a tab portion protruding between said other of said first and second side surfaces of each of said first and second magnet means to thereby locate the circumferential position of said first and second magnet means and thereby said first axial flow passage therebetween relative to said gerotor outlet port and said outlet housing means.

19. A wet motor gerotor pump for pumping a liquid of low electrical conductivity from a liquid source, said pump comprising:

a pump case having one end, an opposite end and a flow axis therethrough, said pump case further comprising an inlet end bore at said one end adapted to communicate with said liquid source and means for sealing said pump case;

an inlet chamber adjacent said inlet end bore;

a motor chamber located in said opposite end of said pump case;

a pump chamber interposed said motor chamber and said inlet chamber;

inlet housing means mounted in said pump chamber, said inlet housing means comprising an annular hub protruding into said inlet chamber, said inlet housing means further comprising a gerotor cavity having a gerotor outlet port, said gerotor cavity disposed about a gerotor axis located parallel to and displaced a predetermined distance in an eccentric radial direction from said flow axis;

outlet housing means having pump outlet means adapted to communicate liquid from said pump and further comprising a second means for sealing coupled to said means for sealing said pump case to said outlet housing means, said outlet housing means further comprising vapor vent means;

electric motor means comprising:

armature means having an axial length and comprising an armature shaft with a first and a second end rotatably supported, respectively, at said inlet housing means and said outlet housing means, said armature means further comprising drive hub means having an axially extending portion; and first and second magnet means, each of said first and second magnet means further comprising an inner and an outer axial surface extending in a direction along said flow axis about said armature means, a first and a second side surface extending in a direction along said flow axis, and a first and a second end surface;

magnet spacing means positioned between said first and second magnet means for spacing said first and second side surfaces of said first magnet means circumferentially with respect to said first and second side surfaces of said second magnet means;

gerotor pump means located in said gerotor cavity, said gerotor pump means comprising an inner pump gear, an outer pump gear, and means for driving said inner and outer pump gears, said gerotor pump means further comprising a locating hole spaced from said gerotor axis;

means for separating said liquid from said armature means as said liquid flows from said gerotor cavity to said outlet housing means, said means for separating said liquid from said armature means comprising keeper means, said keeper means comprising tunnel means having a central bridge portion defining a first axial flow passage and extending axially along said armature length, said central bridge portion further being bounded by a first leg portion and a second leg portion, and first and second spaced apart protrusions extending axially therefrom, said first and second spaced apart protrusions defining a fluid entrance therebetween, said central bridge portion of said tunnel means radially separating said first axial flow passage from said armature means, each said leg portion extending radially outwards from said central bridge portion and separating said one of said first and second side surfaces of said first magnet means from said one of said first and second side surfaces of said second magnet means, said tunnel means further comprising an extension portion extending axially towards said gerotor pump means and adapted to abut thereagainst, said first and second leg portions each comprising tab means interposed said gerotor pump means and one of said first and second end surfaces of each of said first and second magnet means, whereby said tab means cooperate with said extension portion to axially space said first and second magnet means a predetermined axial distance from said gerotor pump means so as to allow liquid to flow into said first axial flow passage, such that said keeper means establishes said first axial flow passage past said armature means substantially free of turbulence and flow restrictions and to thereby allow liquid to be pumped at substantially higher flow rates at armature currents substantially lower than without said means for separating, whereby said first axial flow passage allows liquid to be pumped about said armature means and to thereby improve pumping efficiency and performance; and said means for separating said liquid from said armature means further coprising spring means circumferentially biasing the other of said first and second side surfaces of said first magnet means from the other of said first and second side surfaces of said second magnet means to establish a second axial flow passage extending along said flow axis between said first and second magnet means;

whereby said gerotor pump means pumps liquid from said source through said inlet chamber, past said gerotor cavity through said gerotor outlet port into said motor chamber, then along said means for separating said liquid from said armature means into said outlet housing means, said vapor vent means permitting vapor to vent from said gerotor pump means for a predetermined period, said vapor vent means further terminating the venting of vapor upon the pumped liquid being communicated to said vapor vent means.

* * * * *